(12) United States Patent
Bertheau et al.

(10) Patent No.: US 11,156,155 B2
(45) Date of Patent: Oct. 26, 2021

(54) CRANKSHAFT FOR A CONTROLLED VARIABLE COMPRESSION RATIO ENGINE

(71) Applicant: MCE 5 Development, Villeurbanne (FR)

(72) Inventors: René-Pierre Bertheau, Montagny (FR); Philippe Dury, Miribel (FR); Yves Miehe, Lyons (FR)

(73) Assignee: MCE 5 Development, Villeurbanne (FR)

( * ) Notice: Subject to any disclaimer, the term of this patent is extended or adjusted under 35 U.S.C. 154(b) by 0 days.

(21) Appl. No.: 17/058,526

(22) PCT Filed: May 23, 2019

(86) PCT No.: PCT/FR2019/051178
§ 371 (c)(1),
(2) Date: Nov. 24, 2020

(87) PCT Pub. No.: WO2019/224485
PCT Pub. Date: Nov. 28, 2019

(65) Prior Publication Data
US 2021/0199049 A1 Jul. 1, 2021

(30) Foreign Application Priority Data
May 25, 2018 (FR) ...................... 1854434

(51) Int. Cl.
*F02B 75/04* (2006.01)
*F16C 7/06* (2006.01)
*F16C 3/06* (2006.01)

(52) U.S. Cl.
CPC .............. *F02B 75/045* (2013.01); *F16C 3/06* (2013.01); *F16C 7/06* (2013.01)

(58) Field of Classification Search
CPC ...... F02B 75/045; F02B 75/048; F02B 75/32; F02B 75/04; F02B 75/047; F16C 7/06;
(Continued)

(56) References Cited

U.S. PATENT DOCUMENTS 4,301,695 A * 11/1981 Reiher .................. F02B 75/048
123/78 F
5,406,911 A * 4/1995 Hefley .................. F02B 75/045
123/48 B
(Continued)

FOREIGN PATENT DOCUMENTS

DE 10151508 A1 * 7/2002 ............ F02B 75/045
EP 0438121 B1 7/1991
(Continued)

OTHER PUBLICATIONS

International Search Report for International Application No. PCT/FR2019/051178 dated Aug. 6, 2019, 2 pages.
(Continued)

*Primary Examiner* — George C Jin
*Assistant Examiner* — Teuta B Holbrook
(74) *Attorney, Agent, or Firm* — TraskBritt

(57) ABSTRACT

A crankshaft for a controlled variable compression ratio engine has an axis of rotation defining a longitudinal axis and comprises at least one crank pin, at least one journal connected by a connecting web, and at least one control element able to move translationally along the longitudinal axis in order to cooperate with an actuator of a system for adjusting the length of a connecting rod. The crankshaft is notable in that the control element, positioned at the connecting arm, comprises an annular part coaxial with the crank pin and capable of establishing continuous contact with the actuator of the system for adjusting the length of the connecting rod, regardless of the angular position of the
(Continued)

crankshaft. The crankshaft comprises a fluidic control circuit for moving the control element along the longitudinal axis.

18 Claims, 7 Drawing Sheets

(58) Field of Classification Search
CPC .... F16C 3/06; F16C 9/04; F16C 23/10; F16C 2226/10; F16C 33/1025; F16C 33/1055; F16C 9/02; F02D 15/02
USPC .............................................. 123/78 E, 78 F
See application file for complete search history.

(56) References Cited

U.S. PATENT DOCUMENTS

| | | | | |
|---|---|---|---|---|
| 2002/0056340 A1* | 5/2002 | Weiss | ................... | F02B 75/048 |
| | | | | 74/595 |
| 2004/0261733 A1* | 12/2004 | Henig | ................... | F02B 75/045 |
| | | | | 123/78 E |
| 2008/0184966 A1* | 8/2008 | Marchisseau | ......... | F02B 75/048 |
| | | | | 123/48 B |
| 2012/0145117 A1* | 6/2012 | Wilkins | ................... | F16C 7/04 |
| | | | | 123/197.3 |
| 2012/0160216 A1* | 6/2012 | Klarer | ................... | F02B 41/04 |
| | | | | 123/48 B |
| 2016/0177997 A1* | 6/2016 | Ezaki | ................... | F16C 7/06 |
| | | | | 123/48 B |
| 2017/0241333 A1* | 8/2017 | Roth | ................... | F02B 75/04 |
| 2018/0245508 A1* | 8/2018 | Tomoda | ................... | F16C 3/28 |
| 2018/0363546 A1* | 12/2018 | Theissl | ................ | F16K 31/004 |
| 2020/0141311 A1* | 5/2020 | Krobath | ................... | F16C 7/06 |
| 2020/0340396 A1* | 10/2020 | Tian | ................... | F16F 15/283 |

FOREIGN PATENT DOCUMENTS

| | | |
|---|---|---|
| FR | 3053734 B1 | 7/2018 |
| FR | 3040437 A1 | 6/2019 |
| WO | 2007/085738 A1 | 4/2007 |
| WO | 2015/193437 A1 | 12/2015 |
| WO | 2016/203047 A1 | 6/2016 |

OTHER PUBLICATIONS

International Written Opinion for International Application No. PCT/FR2019/051178 dated Aug. 6, 2019, 5 pages.

* cited by examiner

CRANKSHAFT FOR A CONTROLLED VARIABLE COMPRESSION RATIO ENGINE

CROSS-REFERENCE TO RELATED APPLICATIONS

This application is a national phase entry under 35 U.S.C. § 371 of International Patent Application PCT/FR2019/051178, filed May 23, 2019, designating the United States of America and published as International Patent Publication WO 2019/224485 A1 on Nov. 28, 2019, which claims the benefit under Article 8 of the Patent Cooperation Treaty to French Patent Application Serial No. 1854434, filed May 25, 2018.

TECHNICAL FIELD

The present disclosure relates to the field of variable compression ratio engines, involving a connecting rod, the length of which is controlled. The present disclosure relates, in particular, to a crankshaft configured to control the actuators of a variable-length connecting rod.

BACKGROUND

Known solutions making it possible to render the compression ratio of an engine variable include ones using a connecting rod whose center distance (i.e., the length of the connecting rod) can be controlled. When the connecting rod has a first length, the engine is configured to have a first compression ratio. When the connecting rod has a second length, the engine is configured to have a second compression ratio.

The connecting rod may be of the telescopic or the eccentric type. In general, the connecting rod is provided with a system, often of a hydromechanical nature, allowing its length to be adjusted.

Whatever type is chosen, the connecting rod can be configured to allow continuous adjustment of its length, between its first length and its second length, so as to continuously adjust the engine compression ratio. Alternatively, the connecting rod may be said to be "bistable." In such configurations, only its first and second lengths form stable positions making it possible to define two engine operating modes, each mode corresponding to a determined compression ratio.

The control of the connecting rod involves instructing the hydromechanical system designed for adjusting its length to set a target length so as to give the engine a predetermined compression ratio.

According to a first known approach, for example, disclosed in document WO2015193437, the transmission of the instruction is carried out mechanically. The control is obtained by impact, while the connecting rod is driven by the crankshaft, between an actuator of the adjustment system (for example, the spool of a hydraulic distributor) and a control part fixed to the engine block. Impact occurs at very high velocity, and this control by impact requires extremely precise positioning of the control part in the engine block, which makes its manufacture particularly complex and expensive. Moreover, this control mode leads to a significant acoustic emission and to rapid wear of the parts that come into contact.

According to another known approach, the transmission of the setpoint is carried out by hydraulic means. Thus, document WO20162047 provides for using the connecting rod bearings lubrication circuit to act on an actuator of the connecting rod length adjustment system through a change in the oil pressure setpoint. A drawback of this type of hydraulic control is a high inertia to the control, linked, in particular, to the fact that the lubrication systems relate to the entire engine, and that it is therefore necessary to apply the pressure change to the entire volume of the lubrication circuit in order to obtain an effect; another drawback of this type of hydraulic control is a high sensitivity to the engine speed, linked to the effect of inertia on the mass of the oil columns driven by the rotating crankshaft.

Moreover, the lubrication circuit being common to all the bearings of the crankshaft, it is not possible to carry out selective cylinder-to-cylinder control.

BRIEF SUMMARY

The present disclosure aims to overcome all or part of the aforementioned drawbacks. It relates to a crankshaft for controlling the connecting rod length of a controlled compression ratio engine.

The present disclosure relates to a crankshaft for a controlled compression ratio engine, having an axis of rotation defining a longitudinal axis. The crankshaft comprises at least one crank pin, at least one journal connected by a connecting arm, and at least one control element able to move translationally along the longitudinal axis to cooperate with an actuator of a system for adjusting the length of a connecting rod.

The crankshaft according to the present disclosure is characterized in that the control element, positioned at the connecting arm, comprises an annular part coaxial with the crank pin and capable of establishing continuous contact with the actuator of the system for adjusting the length of the connecting rod, regardless of the angular position of the crankshaft.

The crankshaft further comprises a fluidic control circuit for moving the control element along the longitudinal axis.

The annular part allows the control element to be brought into contact with the actuator of the connecting rod length adjustment system for all the angular positions of the crankshaft. The crankshaft according to the present disclosure thus avoids a control by impact, the drawbacks of which were mentioned in the introduction.

In order for the control element to come into contact with the actuator or to move away from it, its movement along the longitudinal axis is carried out by a fluidic control circuit independent of the lubrication circuit. An independent circuit offers multiple advantages. On the one hand, it makes it possible to reduce the volume of fluid necessary to transmit the control information, thus reducing the inertia to the control. On the other hand, it makes it possible to work at pressure levels, which are not linked to the lubrication function: therefore, it is possible, for example, to work with a control that oscillates between pressure and vacuum to obtain a control return effect. Finally, it makes it possible to work with a fluid other than oil, for example, a gas, which makes it possible to overcome the effects of inertia linked to the rotational speed of the crankshaft, liable to disturb the control.

According to other advantageous and non-limiting characteristics of the present disclosure, taken alone or in any technically feasible combination:

the control element is positioned in an annular cavity of the connecting arm, at one end of the crank pin, and the fluidic circuit comprises an orifice opening into the cavity;

the crankshaft comprises a clamp fixed to the connecting arm to form an end stop of the control element;

the control element is positioned on the connecting arm and cooperates with two shoulders positioned at one end of the crank pin or in a part of the connecting arm adjoining the crank pin, and the fluidic circuit comprises an orifice opening between the two shoulders;

the fluidic control circuit controls the translational movement of the control element in a first direction, by pressure of a fluid;

the fluidic control circuit controls the translational movement of the control element in a second direction, opposite to the first direction, by vacuum;

the fluid is a gas or a liquid;

the crankshaft comprises a return member for moving the control element translationally along the longitudinal axis, in a second direction opposite to the first direction;

the fluidic control circuit is formed by bores in the crankshaft, communicating over the entire length of the latter from one of its ends;

the crankshaft comprises a control element, positioned at each connecting arm, on either side of each crank pin;

the two control elements positioned on either side of the crank pin are controlled by two separate fluidic control circuits;

the two control elements positioned on either side of the crank pin are controlled by the same fluidic control circuit;

the fluidic control circuit comprises at least one fluidic distributor for opening or closing the fluidic communication to one or the other of the two control elements, depending on the pressure level in the fluidic circuit;

a crank pin is configured to receive two connecting rods.

The present disclosure also relates to a controlled variable compression ratio engine comprising:

an engine block, a crankshaft as above, placed in the engine block, at least one variable-length connecting rod associated with a crankshaft crank pin, the connecting rod comprising a length adjustment system and an actuator of the system, positioned at a side of the connecting rod big end.

According to other advantageous and non-limiting characteristics of the present disclosure, taken alone or in any technically feasible combination:

the crankshaft is connected by a sealed rotating connection to at least one external control system, the latter being configured to carry a fluid in the fluidic control circuit of the crankshaft and being controlled by an engine control unit;

the connecting rod is telescopic or eccentric, two-rate, three-rate or continuous rate;

the controlled variable compression ratio engine comprises a plurality of connecting rods of variable lengths and the fluidic control circuit of the crankshaft is common to the connecting rods;

the controlled variable compression ratio engine comprises a plurality of connecting rods of variable lengths and the crankshaft comprises at least one fluidic control circuit dedicated to each of the connecting rods.

BRIEF DESCRIPTION OF THE DRAWINGS

Other characteristics and advantages of the present disclosure will emerge from the detailed description of example embodiments of the disclosure, which follows with reference to the accompanying figures in which.

The same references in the figures may be used for elements of the same type.

DETAILED DESCRIPTION

The present disclosure relates to a crankshaft 100 configured to control the connecting rod length in a variable compression ratio engine. In such an engine, the connecting rod comprises a system for adjusting its length and an actuator positioned at a side of the connecting rod big end, as mentioned in the introduction.

Figure 1:
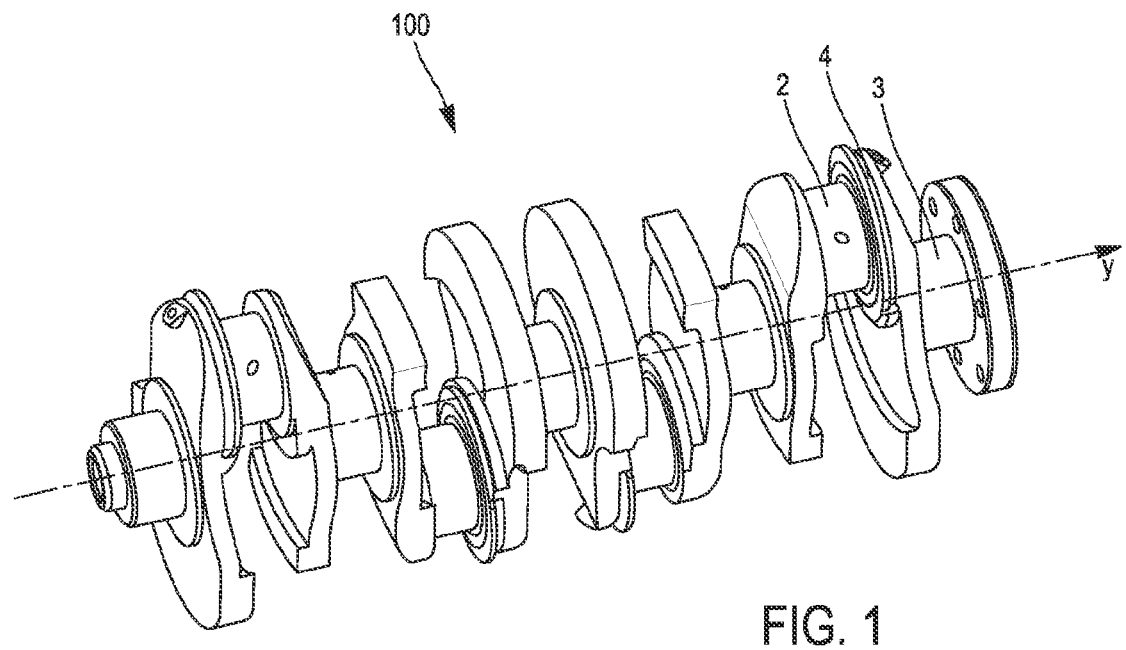
FIG. 1 shows part of a crankshaft according to the present disclosure.

The crankshaft 100 has an axis of rotation defining a longitudinal axis y and comprises at least one crank pin 2 and at least one journal 3 connected by a connecting arm 4. In the example of FIG. 1, the crankshaft 100 comprises four crank pins 2 connected at each of their ends to a connecting arm 4.

Figure 2:
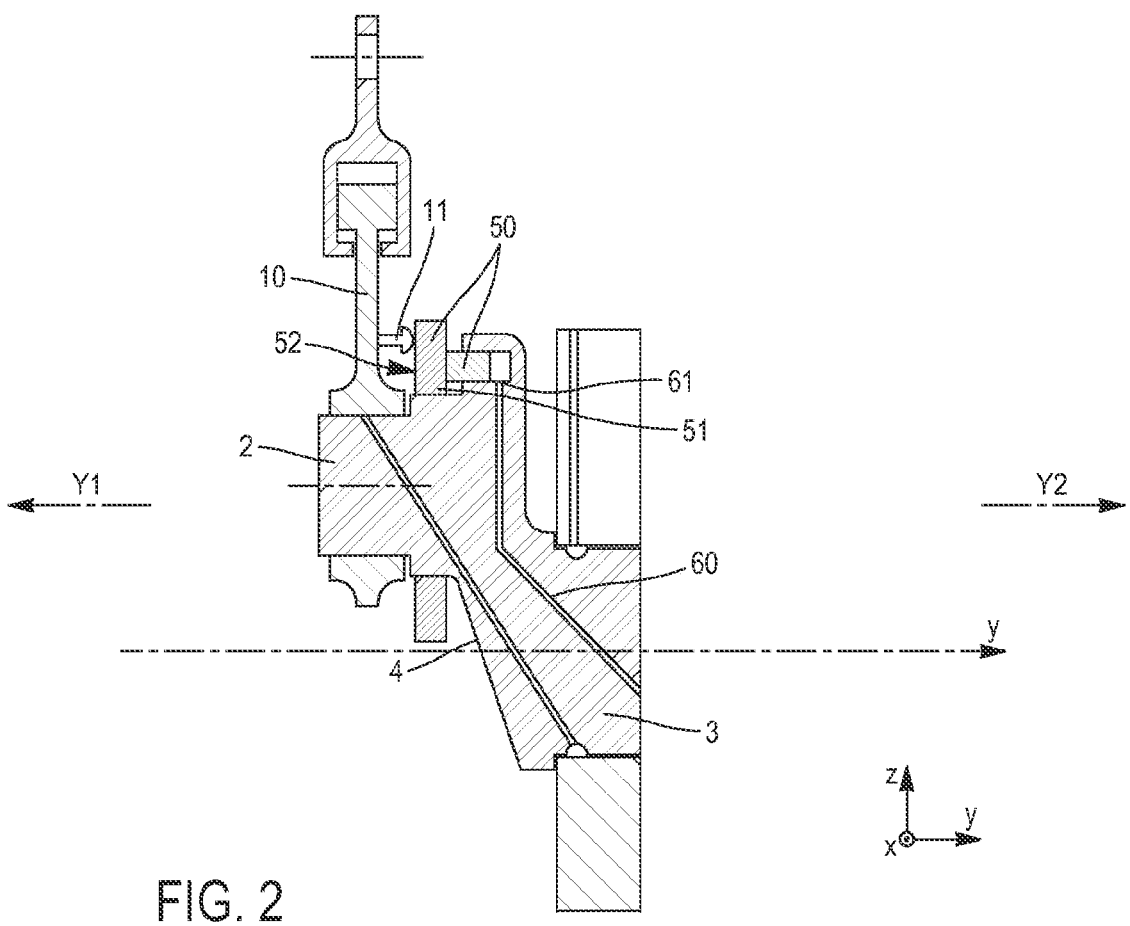
FIG. 2 shows a sectional diagram of a connecting rod mounted on a crankshaft according to the present disclosure.

As shown schematically in FIG. 2, the crankshaft 100 further comprises at least one control element 50. The control element 50 is able to move translationally along the longitudinal axis y in order to cooperate with an actuator 11 of a system for adjusting the length of a connecting rod 10 associated with the crank pin 2.

Preferably, the total stroke of the control element 50 varies from approximately 1 to 2 mm, depending on the configurations and embodiments.

The control element 50 is positioned at the connecting arm 4, at one end of the crank pin 2. It comprises an annular part 51, a flat surface 52 of which extends in a normal plane (x, z) to the longitudinal axis y. The annular part 51 is coaxial with the crank pin 2 and may be capable of establishing continuous contact, via its flat surface 52, with the actuator 11 of the connecting rod 10 length adjustment system, regardless of the angular position of the crankshaft 100. Such a configuration has the advantage of mechanical transmission of the connecting rod length adjustment setpoint without impact.

The crankshaft 100 also comprises a fluidic control circuit 60 configured to move the control element 50 along the longitudinal axis y. The fluidic circuit 60 comprises at least one orifice 61 intended to communicate a fluid with a rear surface (opposite to the flat surface 52) of the control element 50. The fluid may be a gas or a liquid. A gaseous fluid has the advantage of being less influenced by the rotation of the crankshaft, compared to a liquid fluid, due to its very low density.

According to a first advantageous variant, the fluid is a gas, for example, compressed air, and the pressurization of the fluid controls the translational movement of the control element 50 in a first direction Y1 (FIG. 2); preferably a stop will be provided to limit the translational movement (end stop—not shown) of the control element 50. The translational movement of the control element 50 in a second direction Y2, opposite to the first direction Y1, can be operated by depressurizing the fluidic circuit 60.

According to a second variant, the crankshaft 100 comprises at least one return member (not shown) for moving the control element 50 translationally along the longitudinal axis y, in the second direction Y2. The return member may be carried by the connecting rod or by the crankshaft 100 and include a spring system, for example.

Alternatively, the crankshaft 100 has a combination of the two aforementioned variants in order to move the control element 50 translationally along the longitudinal axis y, in the second direction Y2: at least one return member and the depressurization of the fluidic circuit 60.

By way of example, the fluid pressures used in the fluidic control circuit 60 to control the translational movement of the control element 50 in the first direction Y1 will be of the order of a few bars, typically less than 5 bars.

Figure 3:
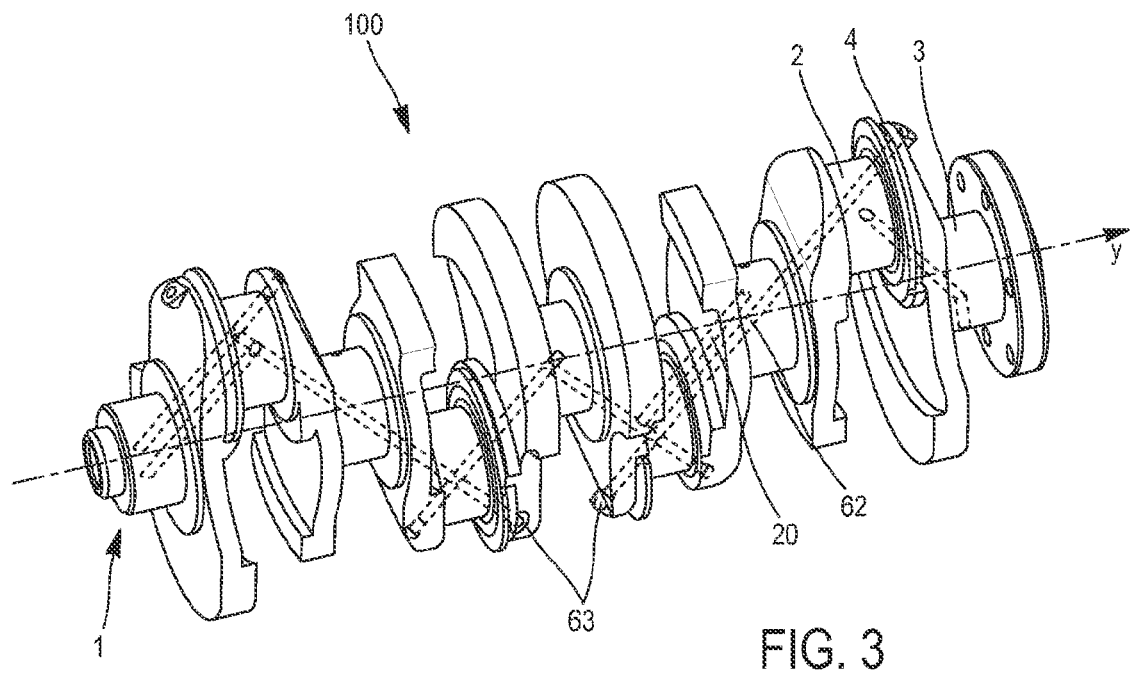
FIG. 3 shows part of a crankshaft according to the present disclosure.

Advantageously, the fluidic control circuit 60 is formed by ducts 62 drilled over the entire length of the crankshaft 100, from one of its ends 1 to the last crank pin 2, opposite this end (FIG. 3). These different bores 62 intersect at the (at least one) crank pin and the (at least one) journal. The fluidic circuit 60 has at least one outlet for the fluid at the connecting arm 4, as stated previously, in order to communicate with the rear surface of the control element 50.

The bores 62 in the crankshaft 100 are independent of those for lubrication 20, which connect the crank pin 2 and the journal 3, and are therefore made so as to avoid the lubrication ducts 20. The ducts 62 may, for example, have a diameter of the order of 4 mm.

An independent fluidic circuit 60 offers multiple advantages. On the one hand, it makes it possible to reduce the volume of fluid necessary to transmit the control information, thus reducing the inertia to the control. On the other hand, it makes it possible to work at pressure levels, which are not linked to the lubrication function: therefore, it is possible, for example, to work with a control, which oscillates between pressure and vacuum in order to obtain a control return effect. Finally, it makes it possible to work with a fluid other than oil, for example, a gas, which makes it possible to overcome the effects of inertia linked to the rotational speed of the crankshaft, liable to disturb the control.

Figure 4A:
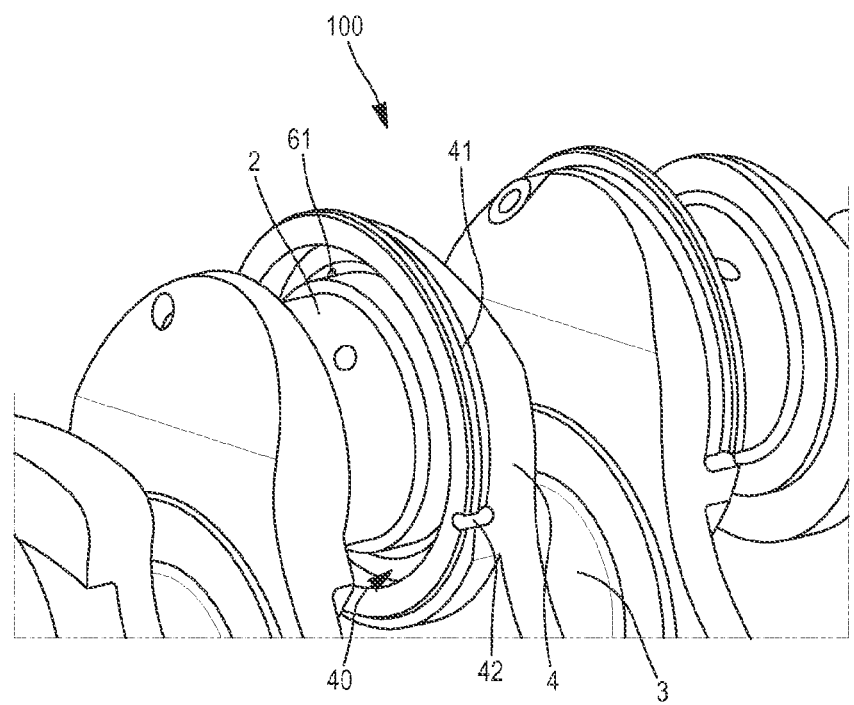
FIGS. 4a to 4d show a crankshaft according to a first embodiment of the present disclosure.
Figure 4B:
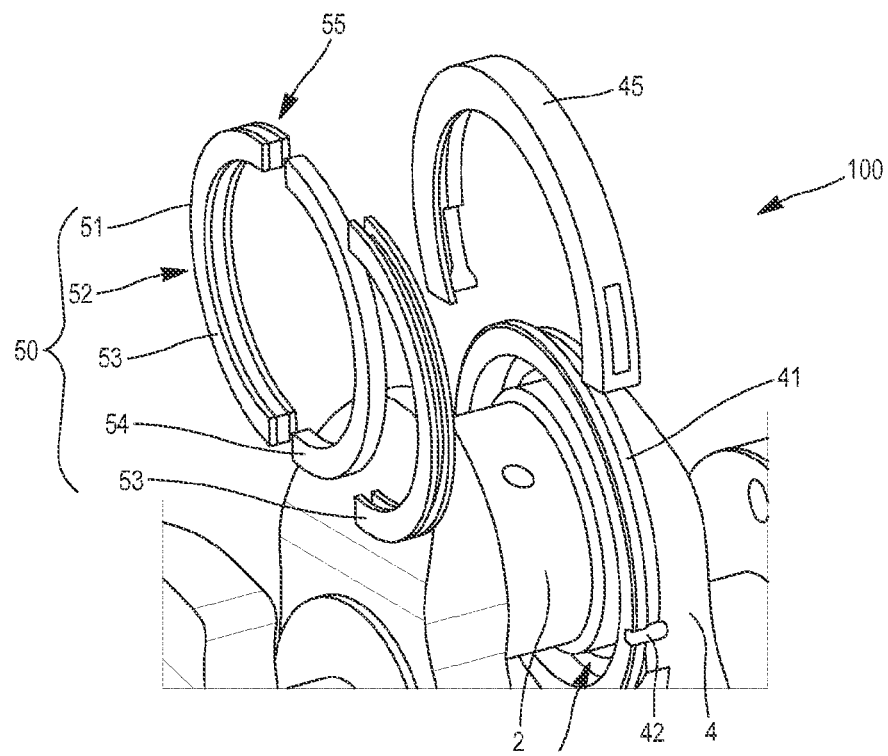
Figure 4C:
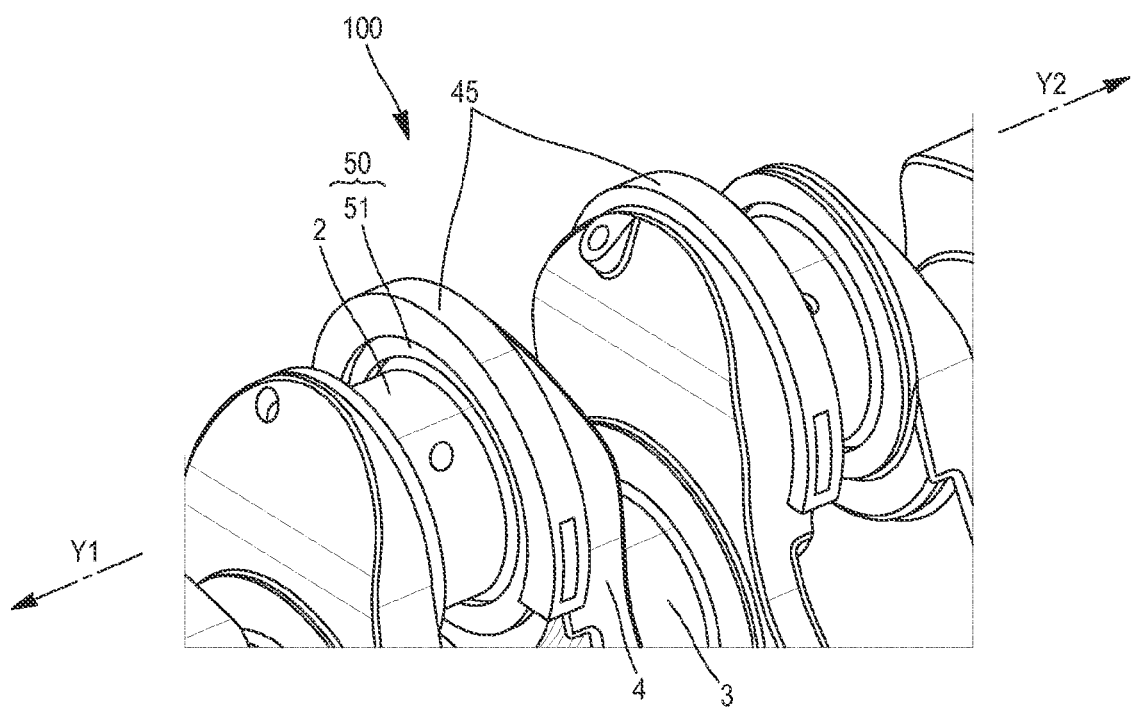
Figure 4D:
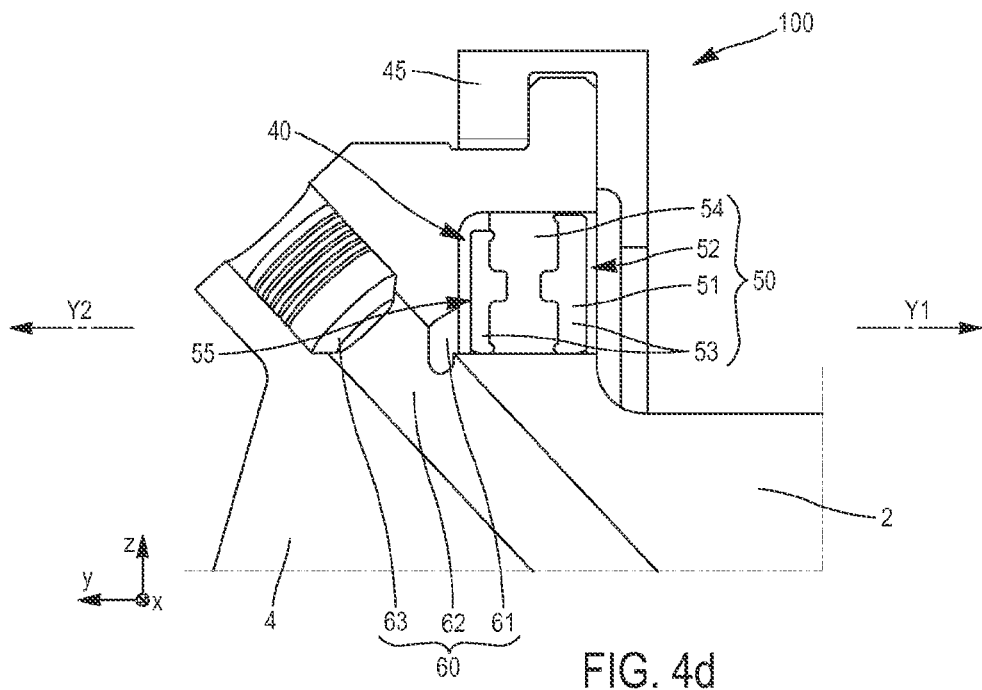
Figure 5A:
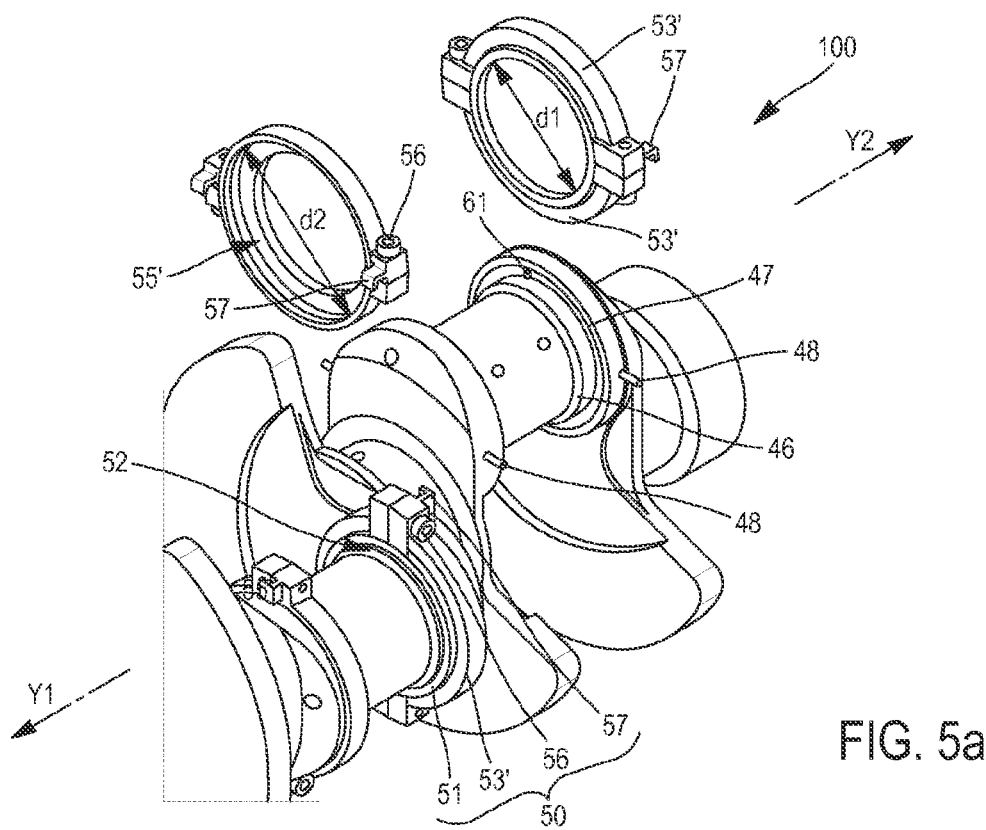
FIGS. 5a and 5c show a crankshaft according to a second embodiment of the present disclosure.
Figure 5B:
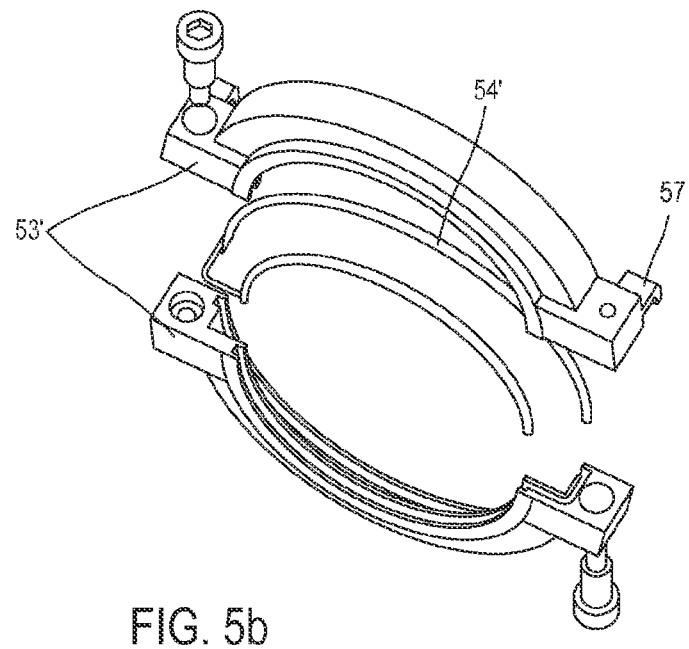
FIG. 5b shows a crankshaft control element according to the second embodiment of the present disclosure.
Figure 5C:
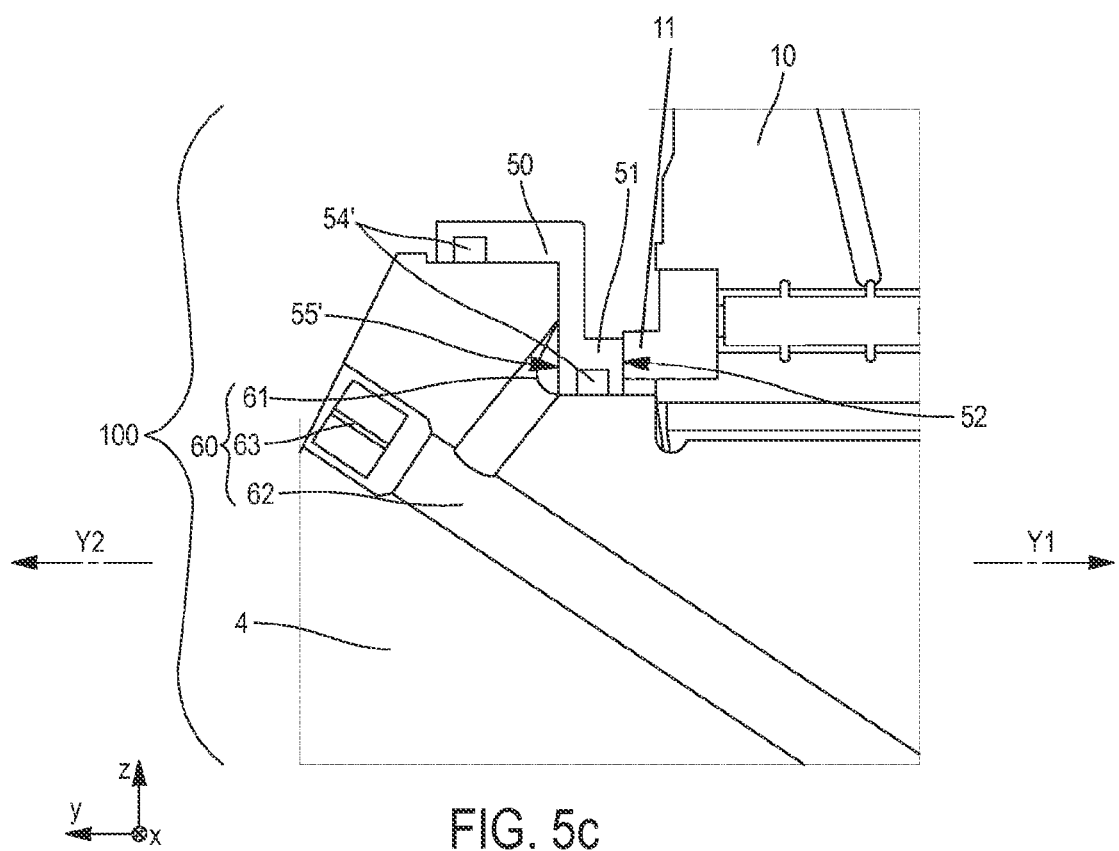

The sealing of the fluidic control circuit 60 is ensured by a series of plugs 63 at the outlet of each bore 62 to the outside of the crankshaft 100 (FIGS. 3, 4*d* and 5*c*).

According to a first embodiment of the present disclosure, an annular cavity 40 is arranged in the connecting arm 4, at one end of the crank pin 2 (FIG. 4*a*). This cavity is intended to form the cylinder body of an annular piston, itself formed by the control element 50. A fluid outlet 61 of the fluidic control circuit 60 opens into the annular cavity 40. The connecting arm 4 also comprises an external centering 41, coaxial with the crank pin 2, as well as two lug housings 42, the function of which will be detailed later. It should be noted that the aforementioned characteristics constitute modifications that can be made by machining a standard crankshaft.

According to this first embodiment, the control element 50 comprises two half-frames 53 (FIG. 4*b*), for example, with an H-profile, intended to be assembled around the crank pin 2, then positioned in the annular cavity 40. Advantageously, the half-frames 53 are metallic. Pins are provided to align and secure the two half-frames 53 after their assembly.

An elastomer 54, intended to ensure sealing between the rear surface 55 and the flat surface 52 of the control element 50, is overmolded on each of the half-frames 53 when the latter is placed in the annular cavity 40.

According to this first embodiment, the crankshaft 100 comprises a clamp 45, which is centered at the external centering 41 and snaps directly onto the connecting arm 4 at the lug housings 42. The clamp 45 forms an end stop of the control element 50 when the latter moves along the longitudinal axis y, in the first direction Y1. It preferably has an annular segment, making it possible to standardize the end stops against the annular part 51 of the control element 50.

Advantageously, the clamp 45 can also act as a side stop for the connecting rod 10 big end.

As illustrated in FIGS. 4*c* and 4*d*, the annular part 51 of the control element 50 (forming the annular piston) has a planar surface 52 capable of establishing continuous contact with the actuator 11 of the length adjustment system of a connecting rod 10 associated with the crank pin 2. Contact with the actuator 11 can be established when the control element 50 is moved in the first direction Y1. This movement is caused by the application of a fluidic pressure on the rear surface 55 of the control element 50. The fluid is directed to the annular cavity 40 (at the rear of the control element 50) through a duct 62 of the fluidic control circuit 60.

The depressurization of the fluidic circuit 60 causes a movement of the control element 50 in the second direction Y2, and thus interrupts the contact with the actuator 11 of the adjustment system of the connecting rod 10. Alternatively, a return member can be provided so as to push back the control element 50 when the fluid pressure on its rear surface 55 falls below a threshold value.

According to a second embodiment of the present disclosure, the crankshaft 100 comprises two shoulders 46, 47 forming two circular rings of different diameters and normal to the axis of the crank pin 2 (FIG. 5*a*). These shoulders 46, 47 are provided at one end of the crank pin 2. They are located on the crank pin 2 or on the part of the connecting arm 4 adjoining the crank pin 2. A fluid outlet 61 of the fluidic control circuit 60 opens between the two shoulders 46, 47.

In this second embodiment, it should be noted that the aforementioned characteristics constitute modifications that can also be produced by machining a standard crankshaft.

According to this second embodiment, the control element 50 comprises two half-shells 53' (FIGS. 5*a*, 5*b*) intended to be assembled together and to cooperate with the two shoulders 46, 47. Therefore, in order to cooperate with the shoulders, the assembly of the half-shells 53' have a front face diameter d1 and a rear face diameter d2, which are different and which are defined to respectively surround the shoulders 46, 47.

Preferably, the half-shells 53' are metallic. Centering and fixings 56 are provided to align and secure the two half-shells 53' after their mounting on the connecting arm 4. A variant using a staple system may also be envisaged for securing the half-shells 53' to each other.

To ensure sealing, an elastomer-type material 54' is placed in suitable grooves in each half-shell 53' (FIG. 5*b*). An elastomer 54' provides the seal between the assembly of half-shells 53' and the shoulder 46 of smaller diameter, at the front face diameter d1. Another elastomer 54' provides the seal between the assembly of half-shells 53' and the shoulder 47 of larger diameter, at the rear face diameter d2. Finally, an elastomer 54' provides the seal between the two half-shells 53'. The fluid of the fluidic control circuit 60, in communication with the internal surface 55' of the control element 50 (internal face of the assembly of half-shells 53') is sealingly kept in the space between the internal surface 55' and the connecting arm 4.

The assembly of half-shells 53' encloses the two shoulders 46, 47, and provides sealing, while retaining the ability to move translationally along the longitudinal axis y.

A stop is also required to limit the stroke of the control element 50 in the first direction Y1, also limiting excessive friction at the sides of the connecting rod 10. By way of example, pins 48 are lodged laterally into the connecting arm 4 and profiles 57 in the shape of lugs are integrated into one of the half-shells 53' to cooperate with the pins 48 (FIG. 5a).

As illustrated in FIGS. 5a and 5c, the annular part 51 of the control element 50 has a substantially planar surface 52 of revolution capable of establishing continuous contact with the actuator 11 of the length adjustment system of a connecting rod 10 associated with the crank pin 2. The contact can be established when the control element 50 is moved in the first direction Y1. This movement is caused by the application of a fluidic pressure on the internal surface 55' of the control element 50. The fluid is directed to the rear surface 55' through a duct of the fluidic control circuit 60.

The depressurization of the fluidic circuit 60 causes a movement of the control element 50 in the second direction Y2, and thus interrupts contact with the actuator of the connecting rod 10 adjustment system. Alternatively, a return member can be provided so as to push back the control element 50 when the fluidic pressure on its rear surface 55' falls below a threshold value.

According to a variant, applicable to the various embodiments of the present disclosure, a control element 50 is positioned at each connecting arm 4, on either side of each crank pin 2 of the crankshaft 100, as illustrated in FIG. 5a, for example.

Figure 6:
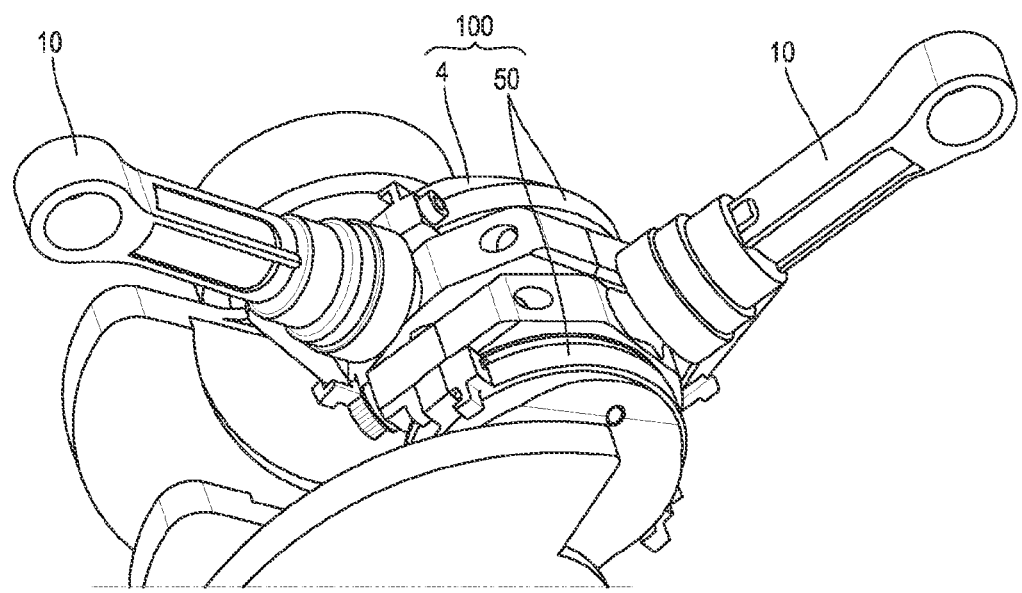
FIG. 6 shows a crankshaft according to the present disclosure and two connecting rods associated with a crank pin of the crankshaft.

Such a configuration can allow for controlling a three-rate connecting rod 10 comprising two actuators, each positioned on a side near the connecting rod big end. It also allows for controlling two connecting rods 10 when the crank pin 2 is precisely configured to receive two connecting rods 10 (FIG. 6).

Figure 5D:
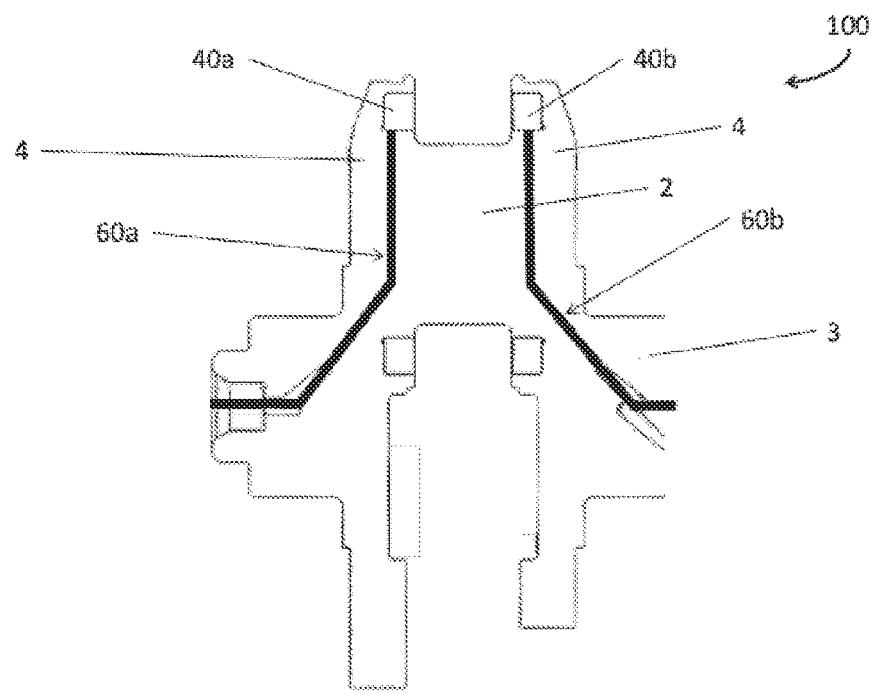
FIGS. 5d and 5e show different configurations of the fluidic control circuit when two control elements are positioned on either side of a crank pin, in a crankshaft according to the present disclosure.

Regardless of the type of control sought, the two control elements 50 positioned on either side of the same crank pin 2 may be controlled by two separate fluidic circuits 60a, 60b: FIG. 5d shows these two fluidic circuits 60a, 60b diagrammatically, each supplying an annular cavity 40a, 40b in front of which the internal surface 55' of the control element 50 (not shown) will be positioned. The implementation of two separate fluidic circuits 60a, 60b makes it possible to control each control element 50 independently of one another.

Figure 5E:
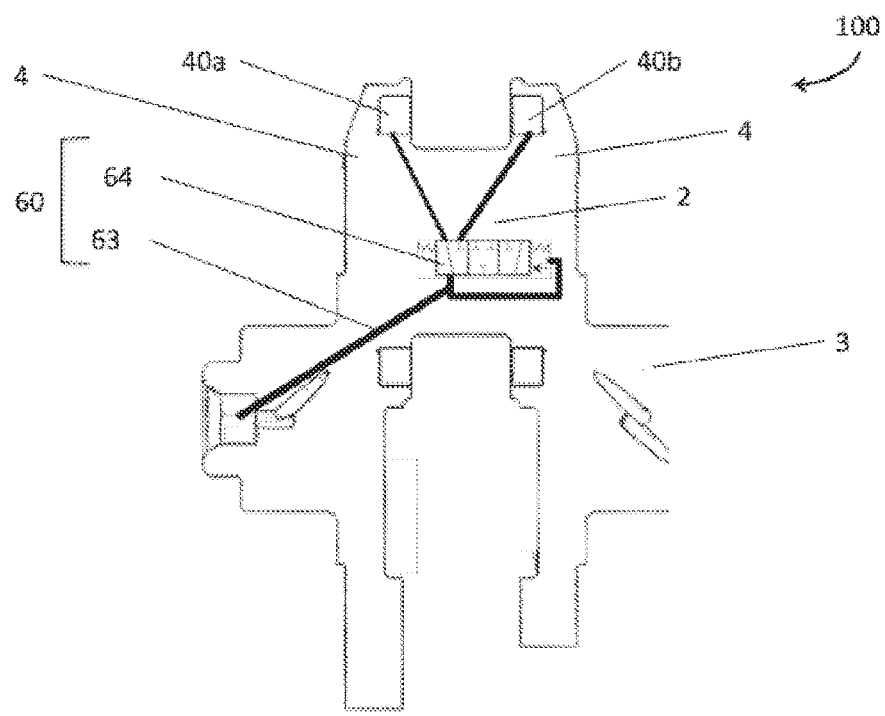

Alternatively, the two control elements 50 positioned on either side of the same crank pin 2 may be controlled by the same fluidic circuit 60 (FIG. 5e).

In this case, according to a first option (not shown), a preloaded valve is arranged in the duct supplying the second annular cavity 40b. For a first pressure level in the fluidic circuit 60, only the first annular cavity 40a will be supplied and, therefore, only the control element 50, connected to this first cavity 40a, will be moved. For a second pressure level, the preloaded valve will allow fluid to flow to the second annular cavity 40b, which will lead to the movement of the control element 50 connected to the second cavity 40b.

According to a second option illustrated in FIG. 5e, a fluidic distributor 64, included in the fluidic circuit 60, makes it possible to control the fluidic opening or closing toward one or the other of the annular cavities 40a, 40b (in front of which the internal surface 55' of a control element 50 will be positioned) depending on the pressure level in the fluidic control circuit 60. Therefore, depending on the pressure level, one or the other of the control elements 50 will be moved in order to cooperate with an actuator 11 of the connecting rod.

Figure 7:
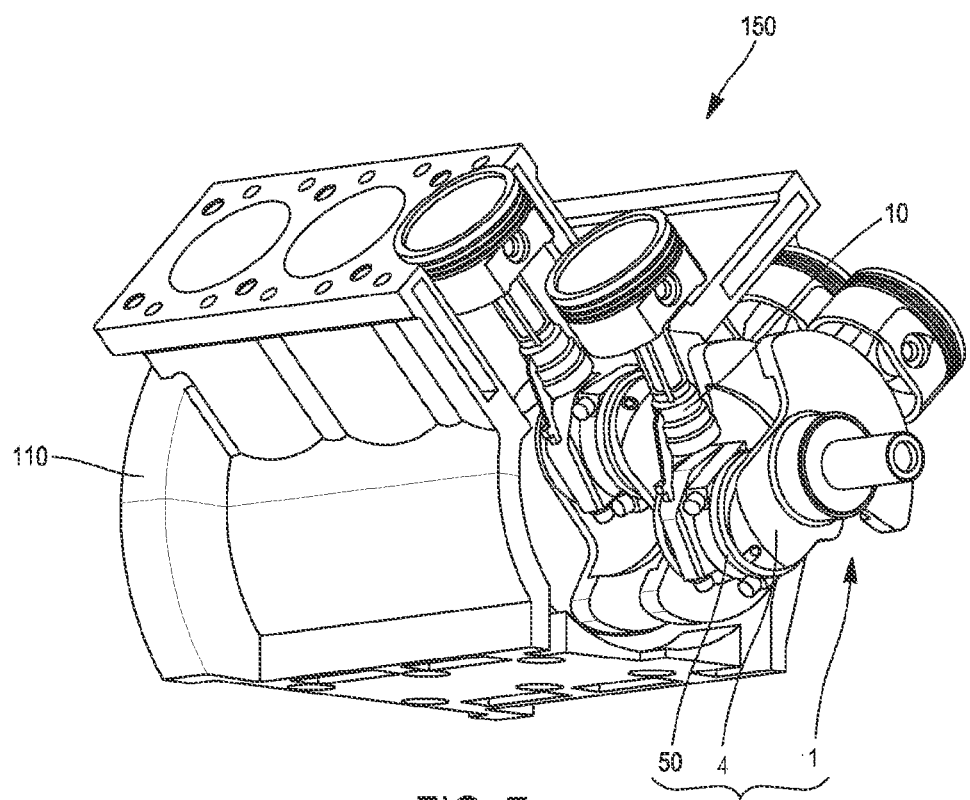
FIG. 7 shows of a controlled compression ratio engine according to the present disclosure.

The present disclosure also relates to an engine 150 with a controlled variable compression ratio. FIG. 7 illustrates an engine 150 according to the present disclosure, having a V-shaped architecture. Alternatively, it could, of course, have an in-line architecture.

The engine 150 comprises an engine block 110 and a crankshaft 100 as disclosed above, positioned in the engine block 110. The engine 150 further comprises at least one variable-length connecting rod 10 associated with a crank pin 2 of the crankshaft 100.

The connecting rod 10 comprises a length adjustment system and an actuator 11 positioned at a side of the connecting rod 10 big end. In particular, the control element 50, carried by the crankshaft 100, is positioned and dimensioned so as to be opposite the actuator 11. Any type of connecting rod 10 of the state of the art, telescopic or eccentric, operating at continuous rate, at two-rate or three-rate, can be used in the engine according to the present disclosure.

The fluidic control circuit 60 of the crankshaft 100 is connected to the outside by the end 1 of the crankshaft 100. The end 1 is designed to receive a rotary seal allowing the connection between the rotating part (crankshaft) and the fixed part (engine block) and thus allowing the fluidic connection of the control circuit 60 with an external control system, positioned outside the engine block 110. It should be noted that the fluidic connection may be axial, that is to say, along the longitudinal axis of the crankshaft 100, or radial, that is to say, in a plane normal to the longitudinal axis y, for example, at a journal 3 of the crankshaft 100.

The external control system is configured to direct the fluid into the control circuit 60. It comprises, in particular, a pressure source such as, for example, an air compressor when the fluid is compressed air. In order to depressurize the control circuit 60 (and control the movement of the control element 50 in the second direction Y2), the external control system may also include a dedicated or shared vacuum pump. The external control system is controlled by the engine control unit (ECU), depending on the engine speed and load.

Of course, the present disclosure is not limited to the embodiments disclosed and it is possible to provide variant embodiments without departing from the scope of the invention as defined by the claims.

The invention claimed is:

1. A crankshaft for a controlled variable compression ratio engine, the crankshaft having an axis of rotation defining a longitudinal axis and comprising:
   at least one crank pin;
   at least one journal connected by a connecting arm;
   at least one control element configured to move translationally along the longitudinal axis to cooperate with an actuator of a system for adjusting a length of a connecting rod, the control element positioned at the connecting arm and comprising an annular part coaxial with the crank pin and capable of establishing continuous contact with the actuator of a system for adjusting the length of a connecting rod, regardless of an angular position of the crankshaft; and a fluidic control circuit for moving the control element along the longitudinal axis.

2. The crankshaft of claim 1, wherein the control element is positioned in an annular cavity of the connecting arm at one end of the crank pin, and wherein the fluidic control circuit comprises an orifice opening into the cavity.

3. The crankshaft of claim 2, further comprising a clamp fixed to the connecting arm to form an end stop of the control element.

4. The crankshaft of claim 1, wherein the control element is positioned on the connecting arm and cooperates with two shoulders provided at one end of the crank pin or in a part of the connecting arm adjoining the crank pin, and wherein the fluidic control circuit comprises an orifice opening between the two shoulders.

5. The crankshaft of claim 1, wherein the fluidic control circuit controls the translational movement of the control element in a first direction by pressure of a fluid.

6. The crankshaft of claim 5, wherein the fluidic control circuit controls the translational movement of the control element in a second direction by vacuum, the second direction being opposite to the first direction.

7. The crankshaft of claim 5, wherein the fluid is a gas or a liquid.

8. The crankshaft of claim 1, wherein the fluidic control circuit is formed by bores in the crankshaft communicating over an entire length thereof from one of its ends.

9. The crankshaft of claim 1, comprising a control element positioned at each connecting arm on either side of each crank pin.

10. The crankshaft of claim 9, wherein the two control elements positioned on either side of the crank pin are controlled by two separate fluidic control circuits.

11. The crankshaft of claim 9, wherein the two control elements positioned on either side of the crank pin are controlled by the same fluidic control circuit.

12. The crankshaft of claim 11, wherein the fluidic control circuit comprises at least one fluidic distributor for opening or closing the fluidic communication to one or the other of the two control elements, depending on a pressure level in the fluidic control circuit.

13. The crankshaft of claim 9, wherein the crank pin is configured to receive two connecting rods.

14. A controlled variable compression ratio engine, comprising:
an engine block;
a crankshaft according to claim 1 positioned in the engine block; and
at least one variable-length connecting rod associated with the crank pin of the crankshaft, the connecting rod comprising a length adjustment system and an actuator positioned at a side of the connecting rod.

15. The engine of claim 14, wherein the crankshaft is connected by a sealed rotary connection to at least one external control system, the at least one external control system configured to direct a fluid in the fluidic control circuit of the crankshaft and being controlled by an engine control unit.

16. The engine of claim 14, wherein the connecting rod is telescopic or eccentric, two-rate, three-rate or continuous rate.

17. The engine of claim 14, further comprising a plurality of variable length connecting rods, and wherein the fluidic control circuit of the crankshaft is common to the connecting rods of the plurality.

18. The engine of claim 14, further comprising a plurality of variable length connecting rods, and wherein the crankshaft comprises at least one fluidic control circuit dedicated to each of the connecting rods of the plurality.

* * * * *